(12) United States Patent
Shah-Nazaroff

(10) Patent No.: US 6,411,277 B1
(45) Date of Patent: *Jun. 25, 2002

(54) METHOD AND APPARATUS FOR CONTROLLING A POINTER DISPLAY BASED ON THE HANDLING OF A POINTER DEVICE

(75) Inventor: Anthony A. Shah-Nazaroff, Santa Clara, CA (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/183,279

(22) Filed: Oct. 30, 1998

(51) Int. Cl.[7] .................................................. G09G 5/08

(52) U.S. Cl. ........................ 345/157; 345/163; 345/160

(58) Field of Search ................................ 345/156, 157, 345/158, 169, 159, 160, 161, 162, 163, 164, 165, 167, 145

(56) References Cited

U.S. PATENT DOCUMENTS

| | | | | |
|---|---|---|---|---|
| 5,724,106 A | * | 3/1998 | Autry et al. ................. | 348/734 |
| 5,847,695 A | * | 12/1998 | Duncan et al. .............. | 345/163 |
| 5,920,304 A | * | 7/1999 | Berstis ........................ | 345/145 |
| 5,923,318 A | * | 7/1999 | Zhai et al. ................... | 345/157 |
| 5,926,168 A | * | 7/1999 | Fan ............................. | 345/158 |
| 5,978,715 A | * | 11/1999 | Briffe et al. .................. | 701/11 |
| 5,990,866 A | * | 11/1999 | Yollin ......................... | 345/157 |
| 5,990,868 A | * | 11/1999 | Frederick .................... | 345/158 |
| 5,999,167 A | * | 12/1999 | Marsh et al. ................ | 345/158 |
| 6,202,212 B1 | * | 3/2001 | Sturgeon et al. ............ | 725/141 |

* cited by examiner

Primary Examiner—Vijay Shankar
Assistant Examiner—Mansour M. Said
(74) Attorney, Agent, or Firm—Blakely, Sokoloff, Taylor & Zafman LLP

(57) ABSTRACT

A pointing device includes a navigation unit that generates position signals that indicate where a pointer is directed. The pointing device includes a selection unit that generates selection signals that indicate that a selection is made. The pointing device includes a sensor unit that generates an active signal that indicates that the pointing device is being handled. A transmission unit is coupled to the navigation unit, selection unit, and sensor unit. The transmission unit transmits the position signals, selection signals, and active signal to a remote location.

25 Claims, 7 Drawing Sheets

METHOD AND APPARATUS FOR CONTROLLING A POINTER DISPLAY BASED ON THE HANDLING OF A POINTER DEVICE

FIELD OF THE INVENTION

The present invention relates to the field of pointer devices. Specifically, the present invention relates to a method and apparatus for controlling a pointer displayed on a graphical user interface based on the handling of a pointer device.

BACKGROUND OF THE INVENTION

A current trend in the electronics and computer industry is the convergence of the computer system and more traditional entertainment system components. As this convergence continues, the computing power of the computer system may be utilized to enhance a viewer's television viewing experience. Convergent systems have already been used to retrieve, store, and display entertainment system data from sources such as cable company databases, digital satellite systems (DSS), vertical blanking intervals (VBI) from broadcasts, the Internet, and other sources.

Graphical user interfaces have been used to allow viewers to access the entertainment system data on the convergent systems. The graphical user interfaces may include selectable identifiers on a display of the television next to video data from a broadcast. The selectable identifiers may be selected to display the entertainment system data. The graphical user interfaces may include a pointer to allow viewers to navigate through the graphical user interface. The pointer may be a small arrow or other symbol on the display that moves as a viewer moves a pointing device. A viewer may select commands and options by positioning the pointer over a desired selectable identifier and clicking a selection button on the pointing device.

In the past, graphical user interfaces on computer systems typically included a pointer that may be controlled by a pointing device such as a mouse, trackball, or touch pad. The pointer typically was displayed by the graphical user interface regardless of whether the pointer device being used. In convergent systems, viewing unobstructed video data is important for improving the viewing experience.

SUMMARY

A pointing device is disclosed. The pointing device includes a navigation unit that generates position signals that indicate where a pointer is directed. The pointing device includes a selection unit that generates selection signals that indicate that a selection is made. The pointing device includes a sensor unit that generates an active signal that indicates that the pointing device is being handled. A transmission unit is coupled to the navigation unit, selection unit, and sensor unit. The transmission unit transmits the position signals, selection signals, and active signal to a remote location.

BRIEF DESCRIPTION OF THE DRAWINGS

The present invention is illustrated by way of example and not by way of limitation in the figures of the accompanying drawings, in which like references indicate similar elements and in which.

DETAILED DESCRIPTION

Figure 1:
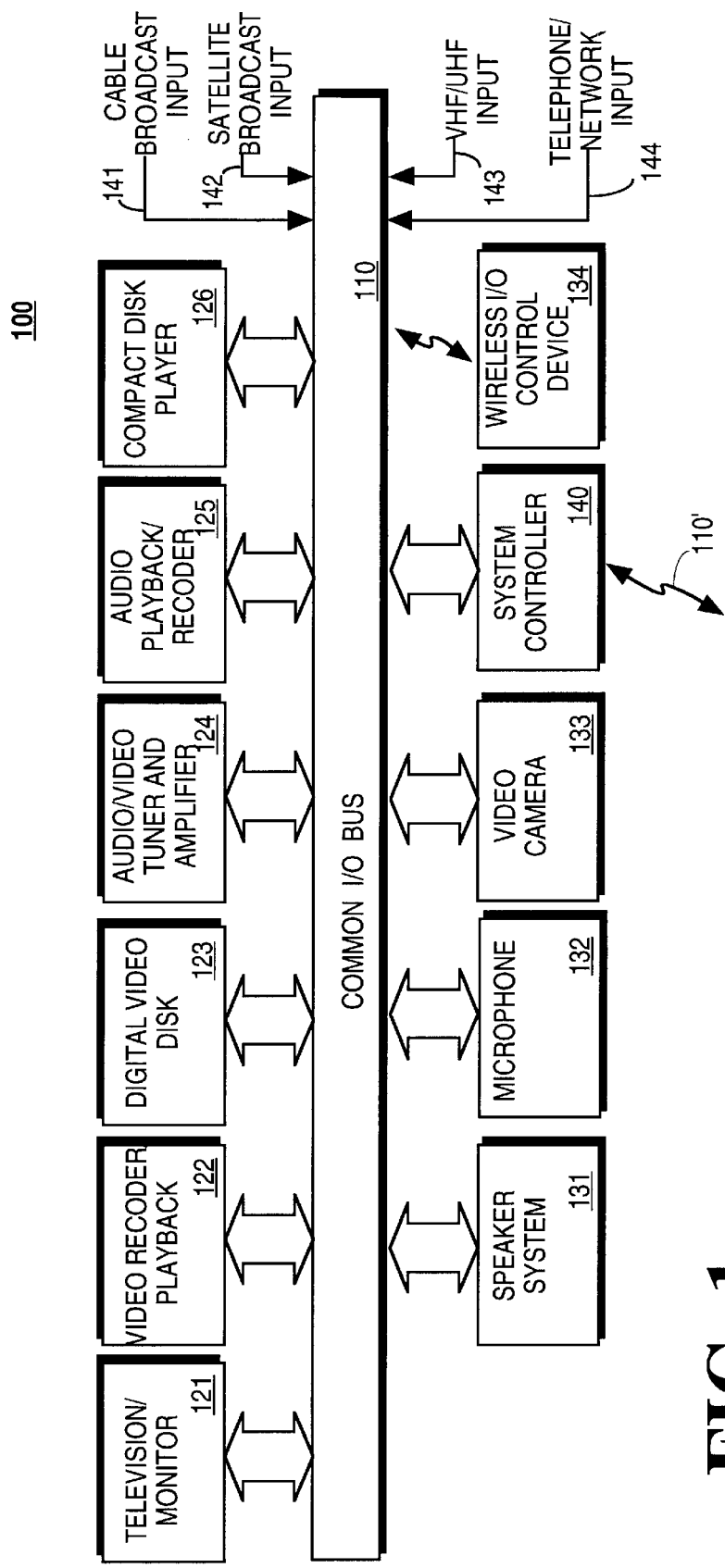
FIG. 1 is a block diagram illustrating the system components of one embodiment of an entertainment system according to the present invention.

FIG. 1 is a block diagram illustrating system components of a convergent entertainment system 100 according to one embodiment of the present invention. The convergent entertainment system 100 includes a common input/output (I/O) bus 110 that connects the system components in the convergent entertainment system 100 together. It should be appreciated that the common I/O bus 110 is illustrated to simplify the routing of signals between the convergent entertainment system components. The common I/O bus 110 may represent a plurality of known mechanisms and techniques for routing I/O signals between the convergent entertainment system components. For example, the common I/O bus 110 may include an appropriate number of independent audio "patch" cables that rout audio signals, coaxial cables that rout video signals, two-wire serial lines or infrared or radio frequency transceivers that rout control signals, or other routing mechanisms that rout other signals.

In the illustrated embodiment, the convergent entertainment system 100 includes a television/monitor 121, video recorder/playback device 122, digital video disk (DVD) recorder/playback device 123, audio/video tuner and amplifier 124, audio playback/recorder device 125, and compact disk player 126 coupled to the common I/O bus. The video recorder/playback device 122, DVD recorder/playback device 123, audio playback/recorder device 125, and compact disk player 126 may be single disk or single cassette devices, or alternatively may be multiple disk or multiple cassette devices.

In addition, the convergent entertainment system 100 includes a speaker system 131, microphone 132, video camera 133, and a wireless I/O control device 134. In one embodiment, wireless I/O control device 134 is an entertainment system remote control unit, which communicates with the components of the convergent entertainment system 100 through IR signals. In another embodiment, wireless I/O control device 134 may be a wireless keyboard and pointer-positioning device that communicates with the components of convergent entertainment system 100 through IR signals or RF signals. In yet another embodiment, wireless I/O control device 134 may be an IR remote control device similar in appearance to a typical entertainment system remote control with the added feature of a track-ball, finger pad, joystick, or other navigational mechanisms which allows a user to position a pointer on a display of the convergent entertainment system 100.

The convergent entertainment system 100 also includes a system controller 140. According to one embodiment of the present invention, the system controller 140 operates to store and display entertainment system data available from a plurality of entertainment system data sources. According to another embodiment of the present invention, the system controller 140 is configured to control a wide variety of features associated with each of the system components. As shown in FIG. 1, the system controller 140 is coupled, either directly or indirectly, to each of the convergent entertainment system components, as necessary, through I/O bus 110. In one embodiment, in addition to or in place of I/O bus 110, system controller 140 is configured with a wireless communication transmitter (or transceiver), which is capable of communicating with the system components via IR signals or RF signals 110'. Regardless of the control medium, the system controller 140 is configured to control one or more of the convergent entertainment system components of the convergent entertainment system 100, although it is understood that each of the components may be individually controlled with wireless I/O control device 134.

As illustrated in FIG. 1, the convergent entertainment system 100 may be configured to receive entertainment selections and entertainment system data from various entertainment selection sources. In one embodiment, the convergent entertainment system 100 receives entertainment selections and entertainment system data from any or all of the following sources: cable broadcast 141, satellite broadcast 142 (e.g., via a satellite dish), very high frequency (VHF) or ultra high frequency (UHF) radio frequency communication of the broadcast networks 143 (e.g., via an aerial antenna), telephone/computer network broadcast 144, and/or information stored locally at system controller 140 or another component of the entertainment system 100. Further, it will be appreciated by one skilled in the art, that cable broadcast input 141, satellite broadcast input 142 and VHF/UHF input 143 may receive input from digital broadcast programming and digital cable programming. The cable broadcast input 141, satellite broadcast input 142, VHF/UHF broadcast input 143, and telephone/computer network broadcast input 144 may be received by the audio/video tuner and amplifier 124, the system controller 140, or other component on the convergent entertainment system 100.

Although the present invention is described in the context of the exemplary embodiments presented in the figures, those skilled in the art will appreciate that the present invention is not limited to these embodiments and may be practiced in a variety of alternate embodiments. Accordingly, the innovative features of the present invention may be practiced in a system of greater or lesser complexity than that of the system depicted in FIG. 1.

Figure 2:
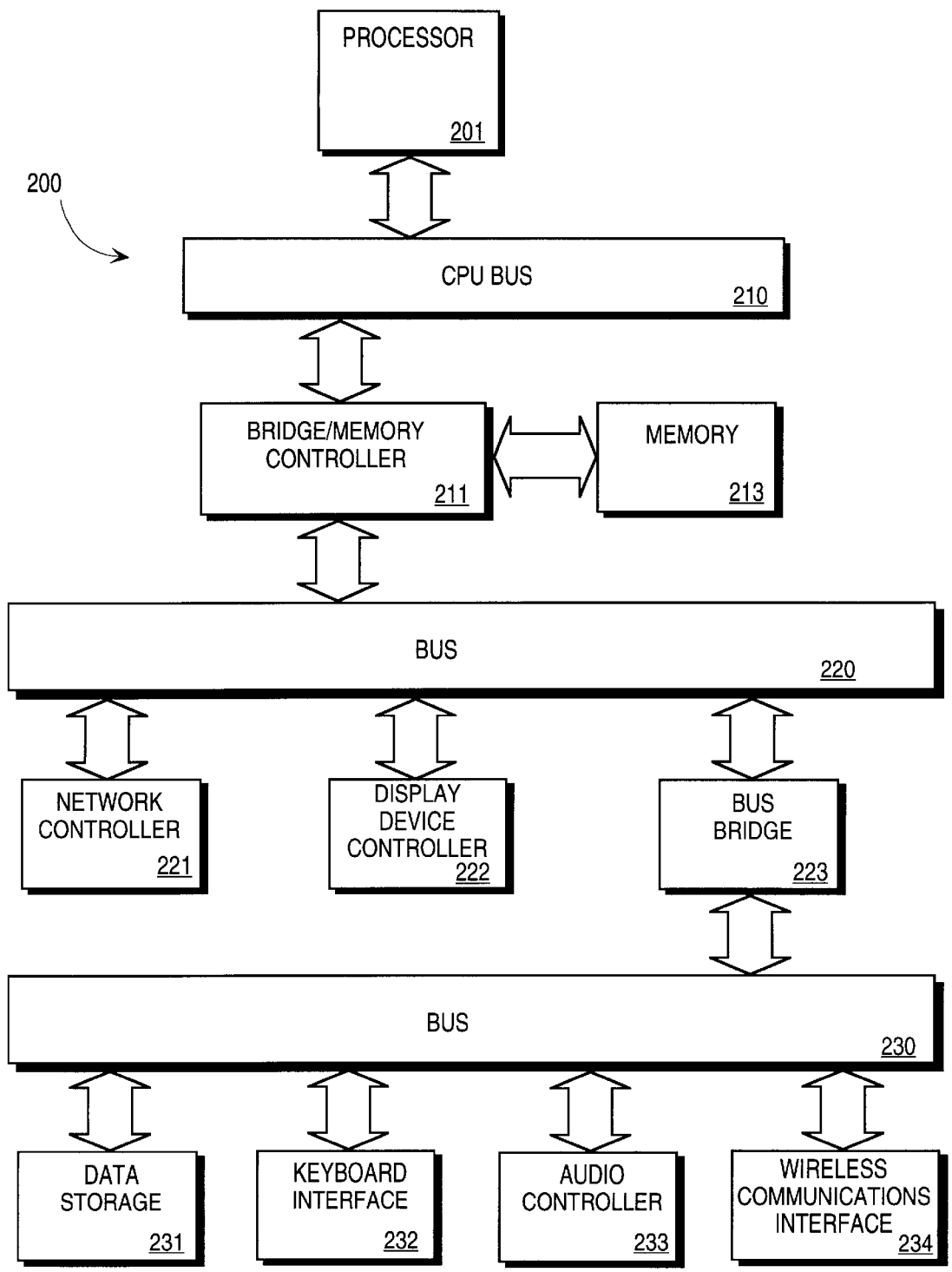
FIG. 2 is a block diagram illustrating one embodiment of a system controller according to the present invention.

FIG. 2 is a block diagram illustrating an embodiment of a computer system 200 that may be used to implement the system controller 140 according to the present invention. The computer system 200 includes a processor 201 that processes data signals. The processor 201 may be a complex instruction set computer (CISC) microprocessor, a reduced instruction set computing (RISC) microprocessor, a very long instruction work (VLIW) microprocessor, a processor implementing a combination of instruction sets, or other processor device. FIG. 2 shows an example of the present invention implemented on a single processor computer system 200. However, it is understood that the present invention may be implemented in a computer system having multiple processors. The processor 201 is coupled to a CPU bus 210, which transmits data signals between processor 201 and other components in the computer system 200.

As an example, memory 213 may be a dynamic random access memory (DRAM) device, a static random access memory (SRAM) device, or other memory device. The memory 213 stores data signals that are executed by the processor 201. A bridge memory controller 211 is coupled to the CPU bus 210 and the memory 213. The bridge memory controller 211 directs data signals between the processor 201, the memory 213, and other components in the computer system 200 and bridges the data signals from these components to a first I/O bus 220.

The first I/O bus 220 may be a single bus or a combination of multiple buses. As an example, the first I/O bus 220 maybe a high performance I/O bus that operates at high throughput rates. The first I/O bus 220 may include for example a Peripheral Components Interconnect (PCI) bus, a Personal Computer Memory Card International Association (PCMCIA) bus, a NuBus, or other buses. The first I/O bus 220 provides communication links between components in the computer system 200. A network controller 221 is coupled to the first I/O bus 220. The network controller 221 links the computer system 200 to a network of computers and supports communication among the machines. A display device controller 222 is coupled to the first I/O bus 220. The display device controller 222 allows coupling of a display device (not shown) to the computer system 200 and acts as an interface between the display device and the computer system 200. The display device controller 222 may be a monochrome display adapter (MDA) card, a color graphics adapter (CGA) card, an enhanced graphics adapter (EGA) card, an extended graphics array (XGA) card or other display device controller. The display device may be a television set, a computer monitor, a flat panel display or other display device. The display device receives data signals from the processor 201 through the display device controller 222 and displays the information and data signals to the user of the computer system 200. According to an embodiment of the present invention, the display device may be implemented by the television/monitor 121 (shown in FIG. 1).

A second I/O bus 230 may be a single bus or a combination of multiple buses. The second I/O bus 230 may include an Industry Standard Architecture (ISA) bus, an Extended Industry Standard Architecture (EISA) bus, or other buses. The second I/O bus 230 provides communication links between components in the computer system 200. A data storage device 231 is coupled to the second I/O bus 230. The data storage device 231 may be a hard disk drive, a floppy disk drive, a CD-ROM device, or other mass storage device. A keyboard interface 232 is coupled to the second I/O bus 230. The keyboard interface 232 may be a keyboard controller or other keyboard interface. The keyboard interface 232 may be a dedicated device or can reside in another device such as a bus controller or other controller. The keyboard interface 232 allows coupling of a keyboard to the computer system 200 and transmits data signals from a keyboard to the computer system 200. An audio controller 233 is coupled to the second I/O bus 230. The audio controller 233 operates to coordinate the recording and playing of sounds. A wireless communications interface 234 is coupled to the second I/O bus 230. The wireless communications interface 234 may be an IR transceiver or a RF transceiver for transmitting and receiving signals between system components of the convergent entertainment system 100 (shown in FIG. 1).

A bus bridge 223 couples the first I/O bus 220 to the second I/O bus 230. The bus bridge 223 operates to buffer and bridge data signals between the first I/O bus 220 and the second I/O bus 230.

According to one embodiment, displaying a pointer on a display device is performed by the computer system 200 in response to the processor 201 executing sequences of instructions contained in the memory 213. Such instructions may be read into the memory 213 from other computer-readable mediums such as data storage device 231 or from a computer connected to the network via the network controller 211. Execution of the sequences of instructions contained in the memory 213 causes the processor to display the pointer on the display device, as will be described hereafter. In alternative embodiments, hard-wire circuitry may be used in place of or in combination with software instructions to implement the present invention. Thus, the present invention is not limited to any specific combination of hardware circuitry and software.

Figure 3:
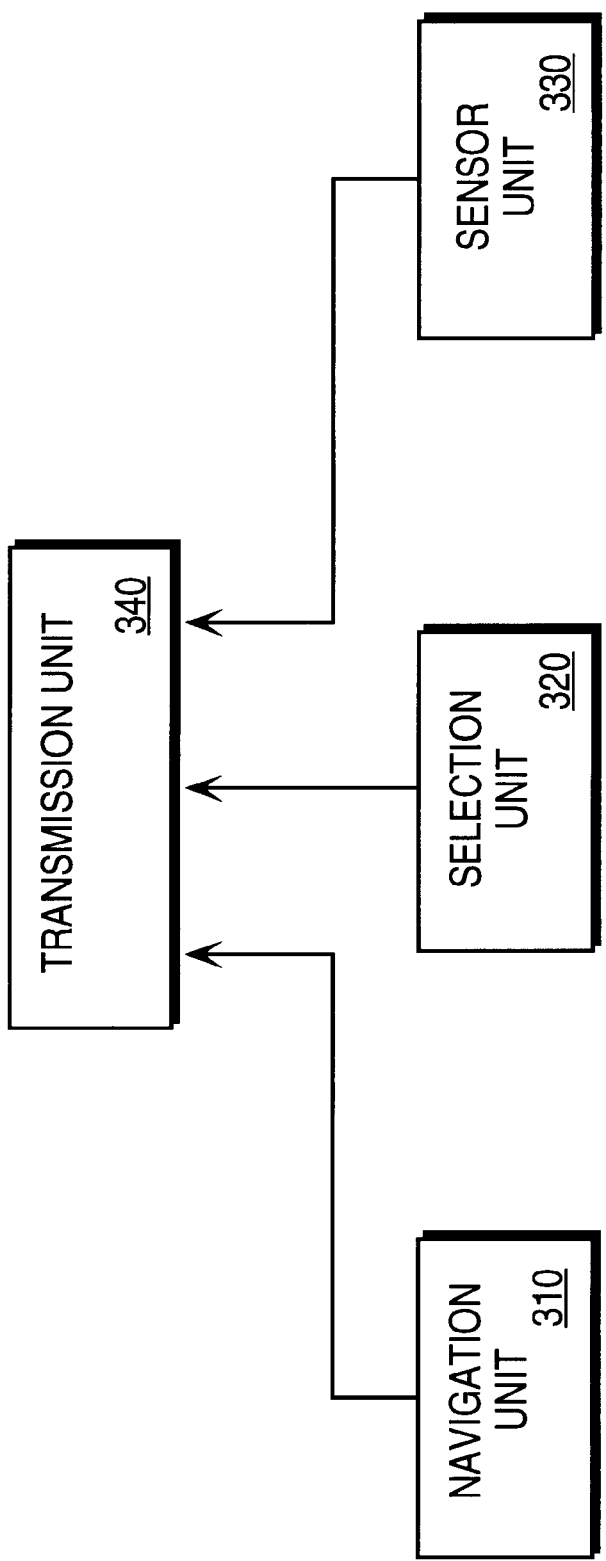
FIG. 3 is a block diagram of a pointing device according to an embodiment of the present invention.

FIG. 3 is a block diagram of a pointing device 300 according to an embodiment of the present invention. The pointing device 300 may be implemented as the wireless I/O control device 134 (shown in FIG. 1). The pointing device 300 includes a navigation unit 310. The navigation unit 310 generates position signals indicating where a pointer is to be directed on a display device. The position signals may include signals that describe a coordinate on a defined coordinate system to move the pointer. The navigation unit 310 includes a position input unit (not shown) that allows a viewer to direct the positioning of the pointer. The position input unit may be a trackball, a touch pad, joystick, a plurality of navigation buttons, or other position input device.

The pointing device 300 includes a selection unit 320. The selection unit 320 generates selection signals indicating when a selection is made. The selection unit 320 may include a button or other selection device on the pointing device 300. A viewer handling the pointing device 300 makes a selection by positioning the pointer with the navigation unit 310 onto a selectable identifier on the graphical user interface and pushing the button in the selection unit 320.

The pointing device 300 includes a sensor unit 330. The sensor unit 330 generates an active signal indicating that the pointing device 300 is being handled. The sensor unit 330 may include a pressure sensor, a motion sensor, or other sensing device that detects when the pointing device 300 is being handled. The sensor unit 330 may be configured on the pointing device 300 such that the sensor unit 330 is triggered whenever the navigation unit 310 or the selection unit 320 is being used. According to an embodiment of the present invention, the sensitivity of the sensor unit 330 may be set such that certain types of handling of the pointing device 300 will not trigger the sensor unit 330.

The pointing device 300 includes a transmission unit 340. The transmission unit 340 is coupled to the navigation unit 310, selection unit 320, and sensor unit 330. The transmission unit 340 receives the position signals from the navigation unit 310, the selection signals from the selection unit 320, and the active signal from the sensor unit 330. The transmission unit 340 transmits the position signals, selection signals, and active signal to a remote location. The transmission unit 340 may include an IR transmitter, an RF transmitter, or other transmitting device. According to an embodiment of the present invention, the transmission unit 340 transmits the position signals, selection signals, and active signal to the wireless communications interface 234 (shown in FIG. 2) of the computer system 200. It should be appreciated that the navigation unit 310, selection unit 320, sensor unit 330, and transmission unit 340 may be implemented using any known circuitry or technique.

Figure 4:
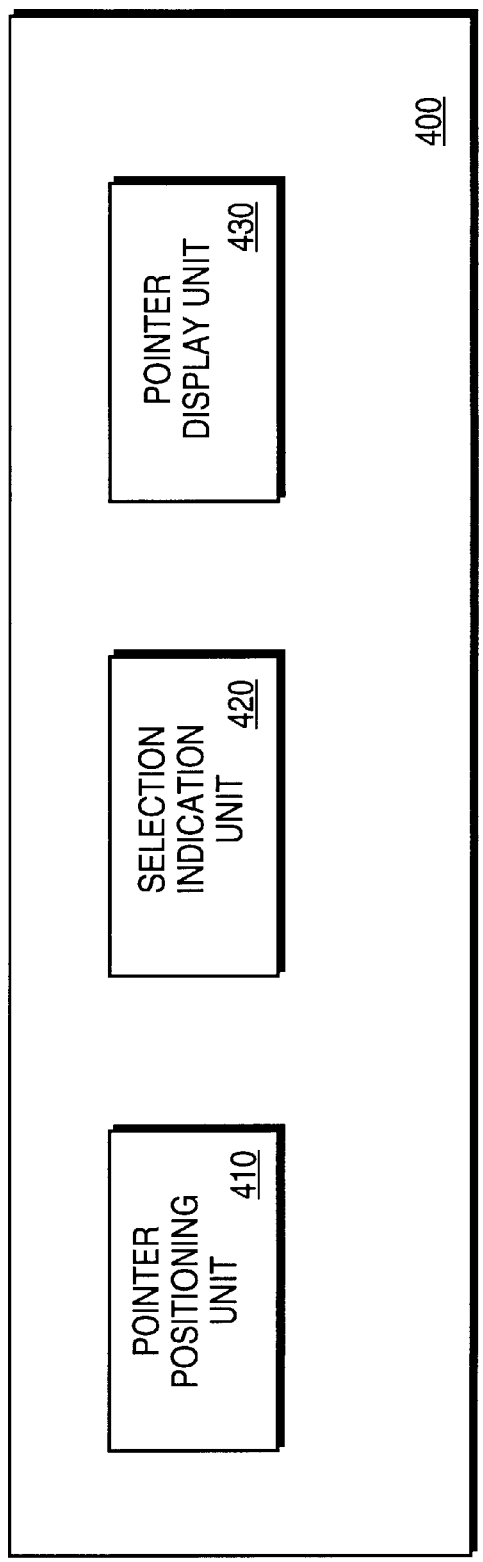
FIG. 4 is a block diagram of modules supporting a pointing device according to an embodiment of the present invention.

FIG. 4 is a block diagram of modules 400 supporting the pointing device 300 (shown in FIG. 3) according to an embodiment of the present invention. In a preferred embodiment of the present invention, the modules 400 are implemented in software and reside in main memory 213 (shown in FIG. 2) of the computer system 200 (shown in FIG. 2) as sequences of instructions. It should be appreciated that the modules 400 may be implemented by hardware as components coupled to the bus 220 (shown in FIG. 2) or a combination of both hardware and software. The modules 400 may be implemented in a device driver for the pointing device 300.

The modules 400 include a pointer positioning unit 410. The pointer positioning unit 410 moves a position of a pointer presented on a display device in response to position signals received from the pointing device 300. The modules 400 include a selection indication unit 420. The selection indication unit 420 notifies the computer system 200 that a selectable identifier on a graphical user interface has been selected in response to selection signals received from the pointing device 300. The modules 400 include a pointer display unit 430. The pointer display unit 430 displays the pointer on the display device in response to an active signal received from the pointing device 300. After the pointer display unit 430 stops receiving an active signal from the pointing device 300, the pointer display stops displaying the pointer or "hides" the pointer on the display device and allows video images on the display device to be displayed unobstructed by the pointer. According to an embodiment of the present invention, the pointer display unit 430 includes a timer unit (not shown) that allows the pointer display unit 430 to stop displaying the pointer after a predefined period of time after the active signal is not received from the pointing device 300.

The pointer positioning unit 410, the selection indication unit 420, and the pointer display unit 430 may be implemented using any known circuitry or technique. In an embodiment of the present invention where the modules 400 are implemented in hardware, the pointer positioning unit 410, the selection indication unit 420, and the pointer display unit 430 all reside on a single semiconductor substrate.

Figure 5A:
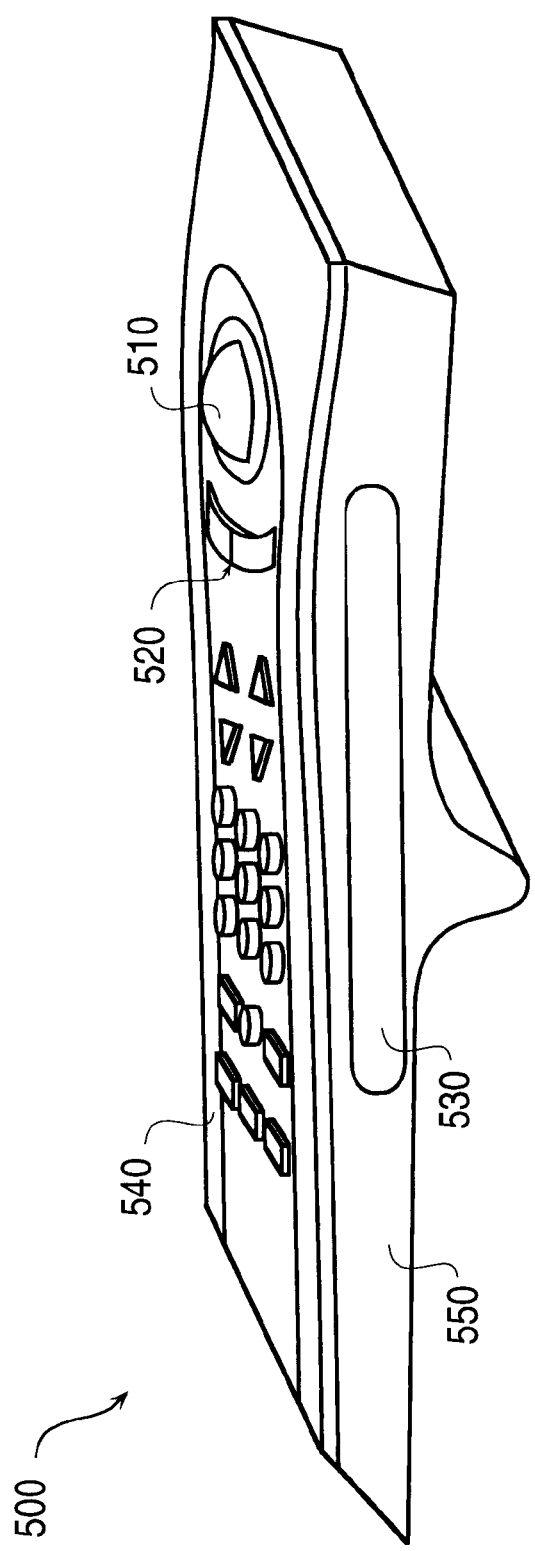
FIG. 5a illustrates a side view of a pointing device according to an embodiment of the present invention.
Figure 5B:
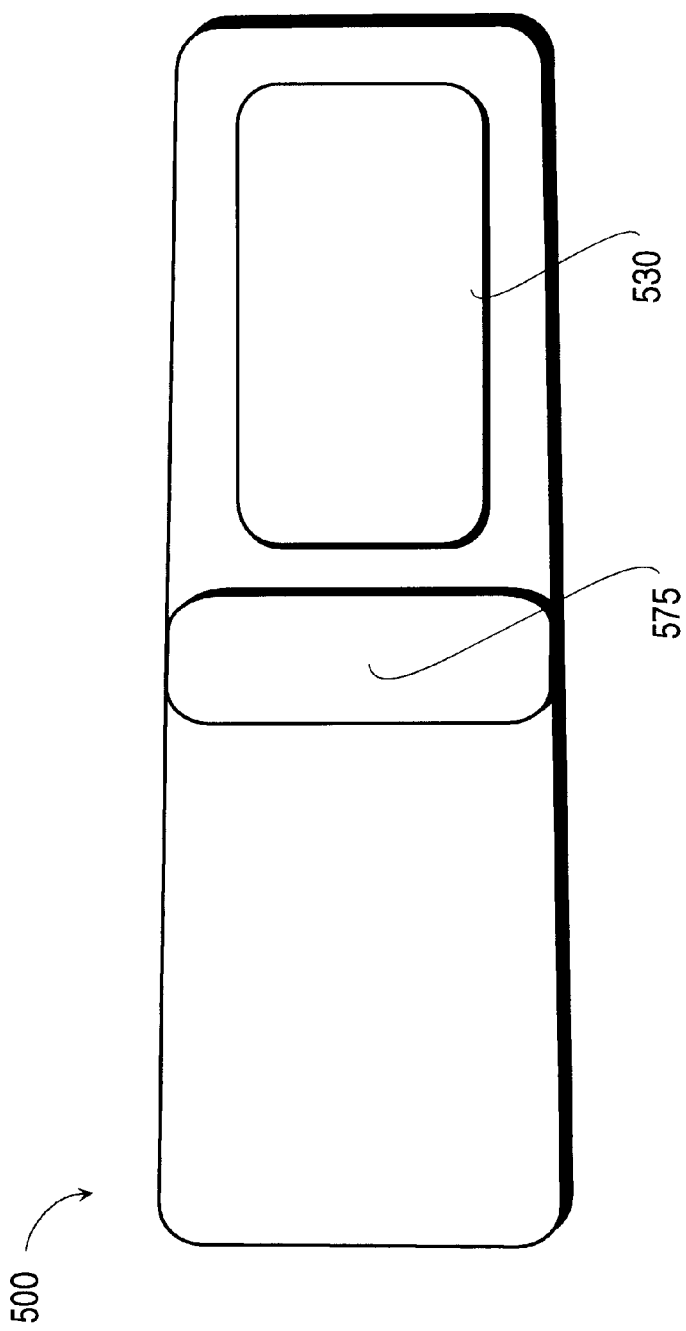
FIG. 5b illustrates a bottom view of a pointing device according to an embodiment of the present invention.

FIG. 5a illustrates a side view of a pointing device 500 according to an embodiment of the present invention and FIG. 5b illustrates a bottom view of the pointing device 500. The pointing device 500 may be implemented as the pointing device 300 shown in FIG. 3. The pointing device 500 includes a position input unit 510. The position input unit 510 allows a person handling the pointing device 500 to direct a position of a pointer on a graphical user interface. The position input unit 510 shown on the pointing device 500 is a trackball. It should be appreciated that the position input unit 510 may alternatively include a finger pad, a joy stick, a plurality of navigation buttons, or other input device.

The pointing device 500 includes selection buttons 520. The selection buttons 520 allow a person handling the pointing device 500 to select options on a graphical user interface by positioning a pointer onto a selectable identifier and pushing one of the selection buttons 520. It should be appreciated that other selection devices may be used in place of the selection buttons 520.

The pointing device 500 includes pressure sensor 530. When depressed, the pressure sensor 530 detects that the pointing device 500 is being handled. The pressure sensor 530 is positioned at the side surfaces 550 of the pointing device 500 and on the bottom surface 575 of the pointing device 500 (see FIG. 5b). By positioning the pressure sensor 530 at locations on the pointing device 500 where a person wishing to use the pointing device 500 would have to depress the pressure sensor 530, the pressure sensor 530 is able to detect whenever the pointing device is being handled. The sensor unit 330 (shown in FIG. 3) generates an active signal in response to the pressure sensor 530 detecting that the pointing device 500 is being handled. It should be appreciated that other sensing devices such as a motion sensor, a touch sensitive trigger, or other sensing device may be used in place of the pressure sensor 530. It should also be appreciated that the pressure sensor 530 or other sensing device may be positioned at other locations on the pointing device 500 than that illustrated in FIGS. 5a and 5b. The pointing device 500 also includes additional selection buttons 540 that allows a person handling the pointing device 500 to make programming selections.

Figure 6:
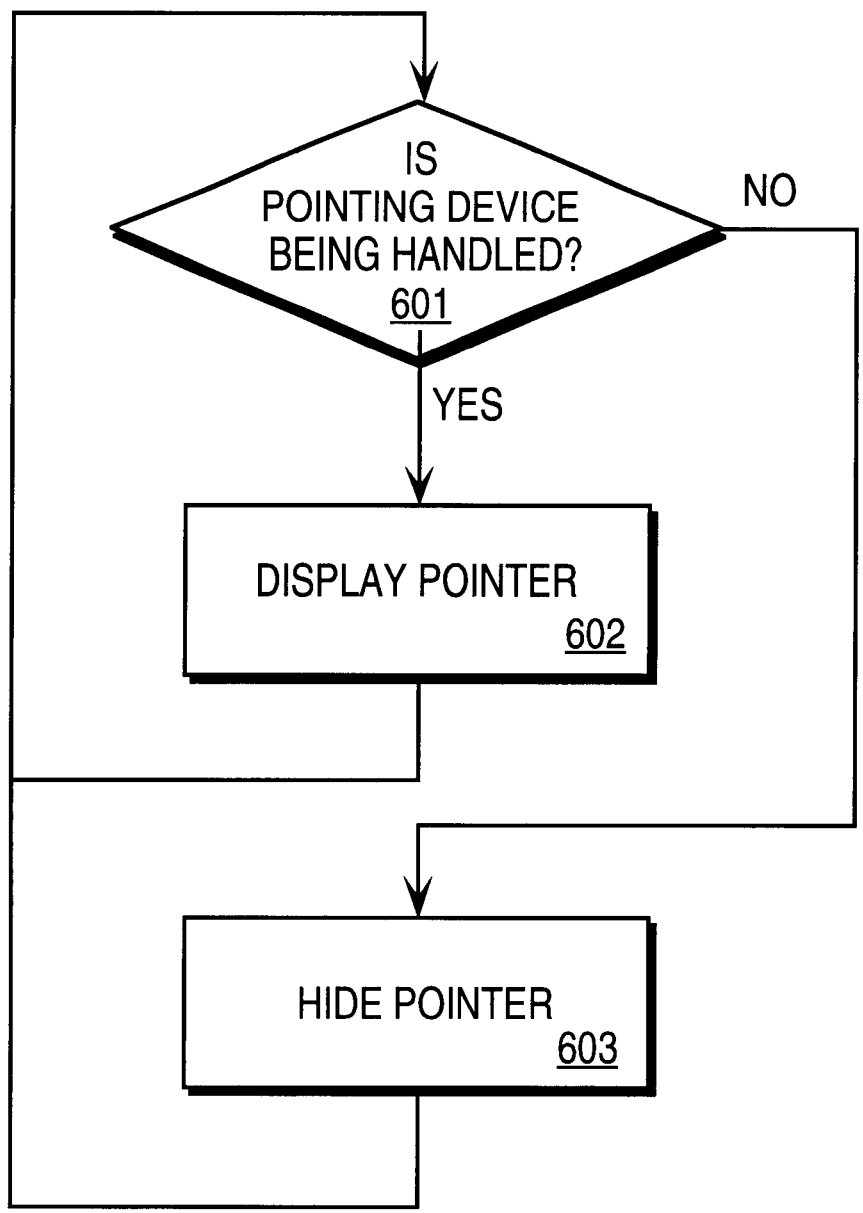
FIG. 6 is a flow chart illustrating a method for displaying a pointer on a display device according to an embodiment of the present invention.

FIG. 6 is a flow chart illustrating a method for displaying a pointer on a display device according to an embodiment of the present invention. At step 601, it is determined whether a pointing device is being handled. If the pointing device is being handled, control proceeds to step 602. If the pointing device is not being handled, control proceeds to step 603. According to an embodiment of the present invention, the step of determining whether the pointing device is being handled is achieved by monitoring an interface for an active signal from the pointing device.

At step 602, the pointer is displayed on the display device.

At step 603, the pointer is hidden on the display device. According to an embodiment of the present invention, hiding the pointer on the display device is performed after a predetermined period of time after the pointing device has stopped being handled.

In the foregoing specification, the invention has been described with references to specific embodiments thereof. It will, however be evident that various modifications and changes may be made thereto without departing from the broader spirit and scope of the invention. The specification and drawings are, accordingly, to be regarded in an illustrative rather than restrictive sense.

What is claimed is:

1. A pointing device, comprising:
   a pointer position function to generate position signals to move a position of a pointer presented on a display device in response to position signals received from the pointing device;
   a selection indication function to generate selection signals to notify a computer system that a selectable identifier on a display device has been selected, the selection signals being different from the position signals, received from the pointing device; and
   a pointer display function to generate active signals to conditionally display the pointer on the display device when the active signal, different from the position signals and the selection signals, is received from the pointing device, the active signal being indicative of the pointing device being held.

2. The pointing device of claim 1, wherein the pointer display function comprises a timer to hide the pointer on the display device after a predetermined period of time.

3. The pointing device of claim 1, wherein the pointer display function comprises a sensor unit and wherein the sensor unit comprises a pressure sensor.

4. The pointing device of claim 3, wherein the pressure sensor is located where a person using the pointing device would have to depress it.

5. The pointing device of claim 3, wherein the pressure sensor is located on the bottom of the pointing device.

6. The pointing device of claim 1, wherein the pointer display function comprises a sensor unit and wherein the sensor unit comprises a motion sensor.

7. The pointing device of claim 1, wherein the pointer position function comprises a navigation unit and wherein the navigation unit comprises a trackball.

8. The pointing device of claim 1, wherein the pointer position function comprises a navigation unit and wherein the navigation unit comprises a finger pad.

9. The pointing device of claim 1, wherein the pointer position function comprises a navigation unit and wherein the navigation unit comprises a plurality of navigation buttons.

10. The pointing device of claim 1, further comprising an infrared transmitter to transmit the position signals, selection signals and active signals to the computer system.

11. A computer system comprising:
    a bus;
    a display device coupled to the bus;
    a processor coupled to the bus;
    a wireless communications interface coupled to the bus; and
    a device driver for a pointing device, including a pointer position function that moves a position of a pointer presented on the display device in response to position signals received from a pointing device, a selection indication function that notifies the computer system that a selectable identifier on the display device has been selected in response to selection signals, different from the position signals, received from the pointing device, and a pointer display function that conditionally displays the pointer on the display device when an active signal, different from the position signals and the selection signals, is received from the pointing device, the active signal being indicative of the pointing device being held.

12. The computer system of claim 11, wherein the pointer display function comprises a timer to hide the pointer on the display device after a predetermined period of time.

13. The computer system of claim 11, wherein the pointing device comprises a remote wireless pointing device, the computer system further comprising a wireless receiver coupled to the wireless communications interface to receive the position signals, selection signals and active signals from the remote pointing device.

14. The computer system of claim 11, wherein the pointer display function comprises a pressure sensor.

15. The computer system of claim 11, wherein the pointer display function comprises a motion sensor.

16. A device driver for a pointing device comprising:
    a pointer position function that moves a position of a pointer presented on a display device in response to position signals received from a pointing device;
    a selection indication function that notifies a computer system that a selectable identifier on a display device has been selected in response to selection signals, different from the position signals, received from the pointing device; and
    a pointer display function that conditionally displays the pointer on the display device when an active signal, different from the position signals and the selection signals, is received from the pointing device, the active signal being indicative of the pointing device being held.

17. The device driver of claim 16, wherein the pointer display function comprises a timer to hide the pointer on the display device after a predetermined period of time.

18. The device driver of claim 16, wherein the pointer display function hides the pointer on the display device when an active signal is not received from the pointing device.

19. The device driver of claim 16, wherein the pointer display function monitors an interface for an active signal indicating that a pressure sensor on the pointing device has been depressed.

20. A method for displaying a pointer on a display device, comprising:

determining whether a pointing device is being handled without a selection or position change being indicated;

displaying the pointer on the display device if the pointing device is being handled without a selection or position change being indicated; and hiding the pointer on the display device if the pointing device is not being handled after a predetermined period of time after the pointing device has stopped being handled.

21. The method of claim 20, wherein determining whether the pointing device is being handled comprises monitoring an interface for an active signal from the pointing device, the active signal indicating that the pointing device is being handled without a selection or position change being indicated.

22. The method of claim 20, wherein determining whether the pointing device is being handled comprises monitoring an interface for an active signal indicating that a pressure sensor on the pointing device has been depressed.

23. A computer-readable medium having stored thereon data representing instructions which, when executed by a machine, cause the machine to perform operations comprising:

determining whether a pointing device is being handled without a selection or position change being indicated;

displaying a pointer on the display device if the pointing device is being handled without a selection or position change being indicated; and hiding the pointer on the display device if the pointing device is not being handled after a predetermined period of time after the pointing device has stopped being handled.

24. The computer-readable medium of claim 23, wherein determining whether the pointing device is being handled comprises monitoring an interface for an active signal from the pointing device.

25. The computer-readable medium of claim 23, wherein determining whether the pointing device is being handled comprises monitoring an interface for an active signal indicating that a pressure sensor on the pointing device has been depressed.

\* \* \* \* \*

UNITED STATES PATENT AND TRADEMARK OFFICE
CERTIFICATE OF CORRECTION

PATENT NO.     : 6,411,277 B1
DATED          : June 25, 2002
INVENTOR(S)    : Shah-Nazaroff It is certified that error appears in the above-identified patent and that said Letters Patent is hereby corrected as shown below:

Column 1,
Line 42, delete "device being used" and insert -- device was being used --.

Signed and Sealed this

Twenty-eighth Day of January, 2003

JAMES E. ROGAN
*Director of the United States Patent and Trademark Office*